FAUNT LE ROY CARTER.
VEHICLE WHEEL AND DEMOUNTABLE RIM.
APPLICATION FILED SEPT. 1, 1914.
1,145,115.
Patented July 6, 1915.
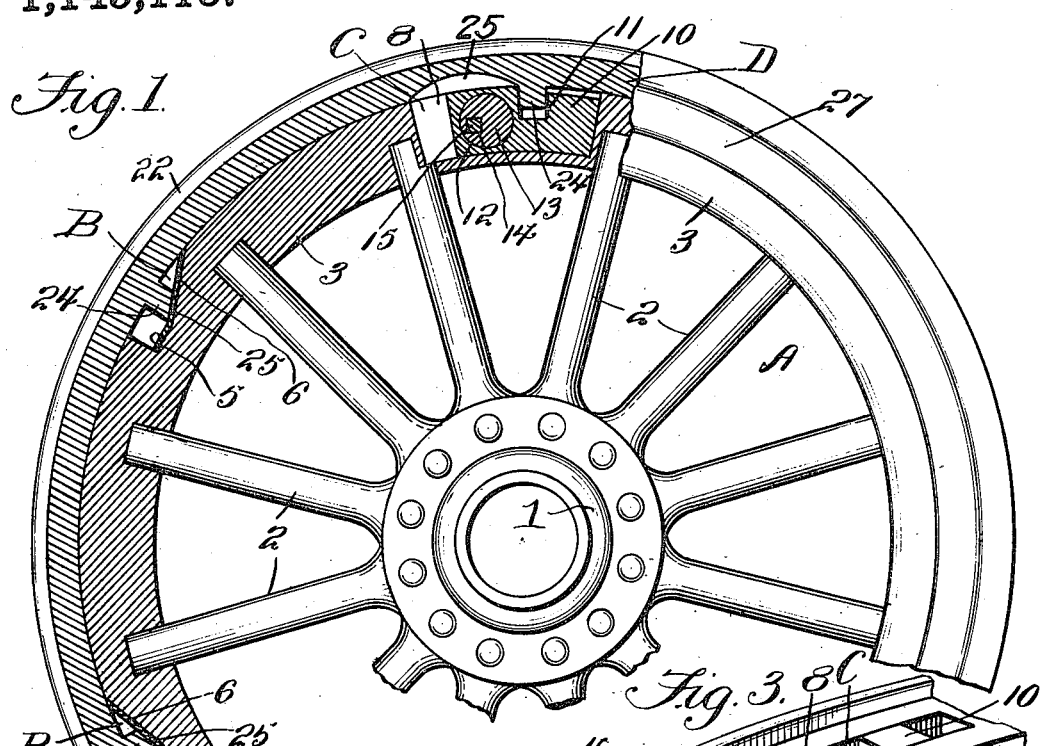
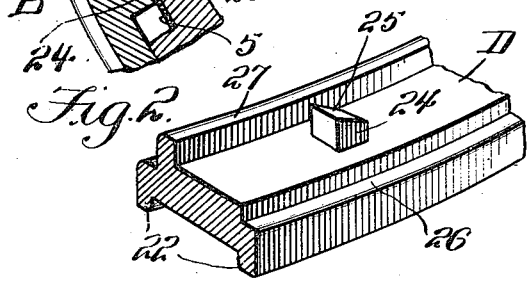
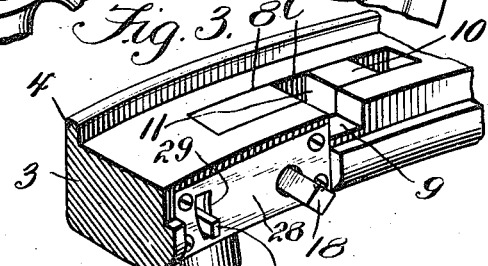
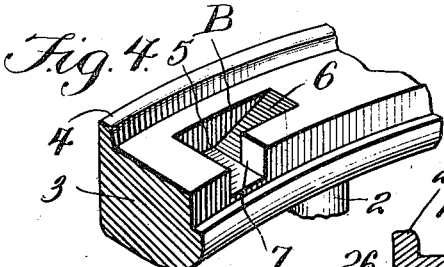
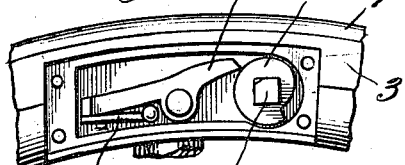
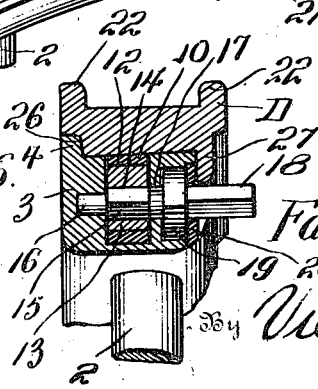
Inventor
Faunt Le Roy Carter
By Victor J. Evans
Attorney
Witnesses

UNITED STATES PATENT OFFICE.

FAUNT LE ROY CARTER, OF SAN MATEO, CALIFORNIA.

VEHICLE-WHEEL AND DEMOUNTABLE RIM.

1,145,115.

Specification of Letters Patent. Patented July 6, 1915.

Application filed September 1, 1914. Serial No. 859,685.

*To all whom it may concern:*

Be it known that I, FAUNT LE ROY CARTER, a citizen of the United States, residing at San Mateo, in the county of San Mateo and State of California, have invented new and useful Improvements in Vehicle-Wheels and Demountable Rims, of which the following is a specification.

This invention relates to vehicle wheels, the object in view being to provide a demountable tire carrying rim, the rim and wheel being so constructed, combined and related to each other that the rim may be easily demounted from the wheel and as easily remounted thereon without disturbing the relation existing between the said demountable rim and the tire carried thereby.

The main object of the present invention is to provide in connection with such a demountable rim and wheel, a single operating device for locking and unlocking the rim in relation to the wheel and at the same time effecting a tight and reliable fit between the rim and wheel which will avoid all rattling of the rim under hard service.

With the above and other objects in view, the invention consists in the novel construction, combination and arrangement of parts, as herein described, illustrated and claimed.

In the accompanying drawings:—Figure 1 is a side elevation partly in section of a portion of a vehicle wheel and rim embodying the present invention. Fig. 2 is a fragmentary inside perspective view of the rim showing one of the lugs. Fig. 3 is a fragmentary perspective view of the wheel showing the locking slide. Fig. 4 is a similar view showing one of the L-shaped grooves or depressions and the wedging floor thereof. Fig. 5 is a detail side elevation of the structure illustrated in Fig. 3, showing the adjacent cover plate removed; and Fig. 6 is a cross section, taken in line with the shaft of the eccentric.

Referring to the drawings A generally designates a wheel embodying the usual hub 1, spokes 2 and felly 3.

In carrying out the present invention the felly 3 is provided at one side with a stop flange 4 extending entirely around the wheel and against which the demountable rim is adapted to abut when slid laterally over the felly. In its peripheral face the felly 3 is provided with a circular series of L-shaped grooves or depressions designated generally at B and each comprising a longitudinal portion 5 embodying an inclined wedging floor 6 and a portion 7 which extends transversely of the tread of the wheel and intersects the longitudinal portion 6, the transverse portion 7 opening out at the side of the wheel for a purpose which will appear.

At one point the tread or peripheral surface of the wheel is formed with a T-shaped depression or slot designated generally at C, said slot comprising the portion 8 which extends longitudinally of the wheel and the transverse portion 9 perpendicular to the portion 8 and opening out at the side of the felly in the same manner as the portions 7 of the depressions B. Mounted to slide lengthwise of the longitudinal portion 8 of the slot C is a locking slide 10 provided intermediate of its ends with a notch or depression 11 which is adapted to move into and out of registry with the transverse portion 9 of the depression for a purpose which will hereinafter appear.

The slide 10 is provided with a circular opening 12 therein in which is mounted an oscillatory disk 13 having an eccentric hole 14 therein which is of non-circular shape and adapted to receive the non-circular portion 15 of a short shaft or spindle 16 which is journaled in a hole 17 in the wheel and has its outer projecting end squared as indicated at 18 to receive a wrench or similar implement for turning the same. Fast on the outer end portion of the shaft or spindle is a ratchet wheel 19 which is adapted to be engaged by a detent 20 normally held in engagement with the ratchet wheel by means of a spring 21. It will now be understood that by turning the shaft or spindle referred to, the disk 13 will be caused to turn in the opening 12 in the locking slide 10, thereby moving said locking slide lengthwise of the longitudinal portion 8 of the depression or groove C so as to throw the notch 11 into or out of alinement with the portion 9 of the depression.

The demountable rim indicated generally at D is provided with the usual tire holding flanges 22 one of which may be detachable to facilitate the application and removal of the tire. The demountable rim D is provided on its inner face with lugs 24 corresponding in number with the depressions in the peripheral face of the wheel, each of said lugs 24 being preferably formed with a beveled extremity 25 adapted to ride against one of the inclined floors 6 of the depressions B. In one of its side faces the rim D is preferably rabbeted as shown at 26 to receive and fit tightly against the flange 4 of the wheel. If desired said rim may be provided at its opposite side with an inwardly extending annular flange 27 to bear against the adjacent face of the felly.

From the foregoing description taken in connection with the accompanying drawings the operation and relation of the wheel and demountable rim will now be understood.

Preparatory to placing the rim on the wheel, the locking slide 10 is moved to a position which will cause the notch 11 therein to register with the portion 9 of the depresssion or groove C. The demountable rim is now slid laterally over the wheel so that the lugs 24 will enter the depressions in the peripheral face of the wheel. When the rim has been moved against the flange 4, the lugs are all in line with the longitudinal portions of the depressions and one of the lugs is resting in the notch 11 of the locking slide. A wrench is now applied to the shaft or spindle and the latter is turned thereby causing the locking slide to actuate the lug engaged thereby, the result being that the demountable rim is given a partial axial movement or turn upon the wheel, the result being that the remaining lugs are caused to ride against the inclined floors of the depressions in the wheel, thereby producing a wedging action between the rim and wheel which will prevent any possibility of rattling between the wheel and rim. The detent 20 then engages the ratchet wheel on the shaft or spindle and prevents the same from working loose and permitting the locking slide to move backwardly. To remove the demountable rim, the operation just above described is reversed, the detent 20 being moved out of engagement with the ratchet wheel and the spindle being turned so as to move the locking slide until the notch therein registers with the portion 9 of the depression C. The rim may now be slid laterally off the wheel.

The rim D is recessed at 25 to admit of a slight outward or radial movement of the slide 10 as the latter is operated by the disk 13.

In order to avoid any possibility of the automobile rim rattling or chattering on the felly, a thin piece *a* of rubber, leather or any other suitable noise absorbing material may be applied to the floor or bottom of each of the recesses B in the felly as illustrated in Fig. 1, against which the projections 24 on the automobile rim bear when the rim is in place on the wheel.

28 designates a cover plate which incloses the space in which the parts 19 and 20 are arranged so as to exclude foreign matter from said parts. The plate 28 is formed with a curved slot 29 to receive the outwardly-projecting end portion of the locking dog 20 as illustrated in Fig. 3. While the members 19 and 20 are covered in by the plate 28, the eccentric and dog may be readily operated from the outside as will be apparent in Fig. 3.

What I claim is:—

1. The combination with a wheel having L-shaped depressions in its peripheral face, of a demountable rim having internal lugs to enter said depressions when the rim is slipped laterally upon the wheel, a locking slide carried by the wheel and movable longitudinally of the peripheral face of the wheel, and means for operating said slide causing it to engage one of said lugs and partially turn the rim around the wheel to establish an interlock between said lugs and walls of the depressions.

2. The combination with a wheel having L-shaped depressions in its peripheral face, of a demountable rim having internal lugs to enter said depressions when the rim is slipped laterally upon the wheel, a locking slide carried by the wheel and movable longitudinally of the peripheral face of the wheel, and means for operating said slide causing it to engage one of said lugs and partially turn the rim around the wheel to establish an interlock between said lugs and walls of the depressions, and means for locking said slide.

In testimony whereof I affix my signature in presence of two witnesses.

FAUNT LE ROY CARTER.

Witnesses:
CLAUDE H. MOORE,
OTTO A. MARTINSON.